(12) United States Patent
Baur et al.

(10) Patent No.: US 12,241,994 B2
(45) Date of Patent: Mar. 4, 2025

(54) ASSORTMENT OF RADAR SENSORS

(71) Applicant: Robert Bosch GmbH, Stuttgart (DE)

(72) Inventors: Klaus Baur, Mietingen (DE);
Christian Hollaender, Waldbronn (DE); Michael Schoor, Stuttgart (DE);
Gustav Klett, Moessingen (DE);
Juergen Hildebrandt, Weilheim (DE);
Minh Nhat Pham,
Leinfelden-Echterdingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 318 days.

(21) Appl. No.: 17/862,289

(22) Filed: Jul. 11, 2022

(65) Prior Publication Data
US 2023/0025442 A1     Jan. 26, 2023

(30) Foreign Application Priority Data
Jul. 22, 2021 (DE) ...................... 10 2021 207 850.8

(51) Int. Cl.
| | |
|---|---|
| G01S 7/03 | (2006.01) |
| G01S 7/02 | (2006.01) |
| G01S 13/931 | (2020.01) |
| H01Q 1/02 | (2006.01) |
| H01Q 1/42 | (2006.01) |
| H01Q 9/04 | (2006.01) |
| H01Q 17/00 | (2006.01) |

(52) U.S. Cl.
CPC .............. *G01S 7/03* (2013.01); *G01S 7/028* (2021.05); *H01Q 1/02* (2013.01); *H01Q 1/42* (2013.01); *H01Q 9/0407* (2013.01); *H01Q 17/00* (2013.01); *G01S 13/931* (2013.01)

(58) Field of Classification Search
CPC .......... G01S 7/03; G01S 7/028; G01S 13/931; H01Q 1/02; H01Q 1/42; H01Q 9/0407; H01Q 17/00
USPC ........................................................ 342/70
See application file for complete search history.

(56) References Cited

U.S. PATENT DOCUMENTS

| | | | | |
|---|---|---|---|---|
| 7,863,728 B2 * | 1/2011 | Beer | .................... | H01Q 1/2283 |
| | | | | 257/E23.129 |
| 8,305,255 B2 * | 11/2012 | Margomenos | ........ | G01S 13/931 |
| | | | | 343/700 R |
| 9,859,613 B2 * | 1/2018 | Pontes | .................. | G01S 13/931 |
| 10,468,764 B2 * | 11/2019 | Kugler | ................. | H01Q 9/0414 |
| 11,394,109 B2 * | 7/2022 | Ndip | .................... | H01Q 1/2283 |

(Continued)

FOREIGN PATENT DOCUMENTS

| | | | | |
|---|---|---|---|---|
| EP | 3330737 A1 * | 6/2018 | ........... | G01S 13/931 |
| EP | 3336575 B1 * | 3/2022 | ........... | G01S 13/931 |
| WO | WO-2021156128 A1 * | 8/2021 | ............... | G01S 7/40 |

*Primary Examiner* — Nuzhat Pervin
(74) *Attorney, Agent, or Firm* — NORTON ROSE FULBRIGHT US LLP; Gerard A. Messina

(57) ABSTRACT

An assortment of radar sensors in different variant embodiments. Each radar sensor has: a housing terminated by a radome, a circuit board that is equipped on the side facing away from the radome with at least one radio-frequency module, and an antenna structure on the side of the circuit board facing the radome. The housing is realized identically in all variant embodiments. The antenna structure has a planar antenna structure in at least one variant embodiment, and has a hollow conductor structure in at least one variant embodiment.

5 Claims, 3 Drawing Sheets

(56) References Cited

U.S. PATENT DOCUMENTS

| | | | | |
|---|---|---|---|---|
| 11,395,370 | B1* | 7/2022 | Statezni | H01Q 5/378 |
| 11,536,829 | B2* | 12/2022 | Woehlte | G01S 13/931 |
| 2002/0190891 | A1* | 12/2002 | Viana | H01Q 21/064 |
| | | | | 342/28 |
| 2008/0316106 | A1* | 12/2008 | Voigtlaender | H01Q 1/3233 |
| | | | | 343/700 MS |
| 2012/0276311 | A1* | 11/2012 | Chirila | H01Q 1/2208 |
| | | | | 428/34.1 |
| 2013/0181859 | A1* | 7/2013 | Waldschmidt | H01Q 9/0407 |
| | | | | 342/70 |
| 2018/0062255 | A1* | 3/2018 | Kugler | H01Q 21/0087 |
| 2018/0231657 | A1* | 8/2018 | Woehlte | H01Q 1/3233 |
| 2020/0243463 | A1* | 7/2020 | Koch | H01L 23/49816 |
| 2020/0249067 | A1* | 8/2020 | Mayer | H01L 23/4952 |
| 2020/0400815 | A1* | 12/2020 | Wintermantel | G01S 7/03 |
| 2021/0003663 | A1* | 1/2021 | Woehlte | G01S 7/03 |
| 2021/0075123 | A1* | 3/2021 | Baek | H01Q 21/065 |
| 2021/0313702 | A1* | 10/2021 | Meyer | H01Q 1/42 |
| 2021/0351499 | A1* | 11/2021 | Ahmadloo | H01L 23/552 |
| 2022/0171018 | A1* | 6/2022 | Cheng | H01Q 17/004 |

* cited by examiner

ASSORTMENT OF RADAR SENSORS

CROSS REFERENCE

The present application claims the benefit under 35 U.S.C. § 119 of German Patent Application No. DE 10 2021 207 850.8 filed on Jul. 22, 2021, which is expressly incorporated herein by reference in its entirety.

FIELD

The present invention relates to an assortment of radar sensors in different variant embodiments, in which each radar sensor has:
a housing terminated by a radome,
a circuit board equipped on the side facing away from the radome with at least one radio-frequency module, and
an antenna structure on the side of the circuit board facing the radome.

In particular, the present invention relates to an assortment of radar sensors that are used in motor vehicles to acquire the traffic environment, for example in the context of driver assistance systems, collision warning systems, or for autonomous driving.

BACKGROUND INFORMATION

Radar sensors are used in motor vehicles for various tasks having different service profiles, for example for monitoring the area in front of the home vehicle in the context of a distance regulation system, as a lateral radar system for acquiring objects in the blind spot, or as a rear area radar system in the context of a lane change assistance function. Radar sensors for autonomous driving have increased performance requirements due to the nature of their function. These different requirements have been taken into account up to now by providing the radar sensors in different variant embodiments.

However, with regard to cost-effective manufacturing it is desirable to keep the number of variants as small as possible.

SUMMARY

An object of the present invention is to provide an assortment of radar sensors that enables an optimization of costs.

According to the present invention, this object may be achieved in that in all variant embodiments the housing is of identical design, and the antenna structure has a planar antenna structure in at least one variant embodiment and has a hollow conductor structure in at least one variant embodiment.

Due to the uniform design of the housing in all variant embodiments, a low-cost manufacturing of the housing in large piece counts is enabled. In order to perform a large portion of the tasks that arise in a motor vehicle, one variant embodiment having a low-cost planar antenna structure, e.g. in microstrip technology, is sufficient. For applications in which particularly low energy losses and/or a large bandwidth and/or a larger lateral detection coverage with larger angles are required, instead of the planar antenna structure a hollow conductor structure is used, which however is higher in cost and is therefore to be used only as needed. Both variant embodiments can be produced in largely uniform manufacturing processes that differ only in that in the one case the planar antenna structure is formed on the circuit board, while in the other case the circuit board is instead equipped with the hollow conductor structure.

Advantageous embodiments and developments of the present invention are disclosed herein.

In accordance with an example embodiment of the present invention, the hollow conductor structure can be designed as a one-layer or multi-layer hollow conductor structure requiring only a small spacing between the circuit board and the radome.

In general, a radar sensor requires an interface for the exchange of data with a higher-level control device. This interface can also be realized in uniform fashion for all variant embodiments. The same also holds for a heat distributor plate for the distribution and dissipation of the lost heat from the active electronic components.

The equipping of the circuit board with electronic components can also be largely identical in the different variant embodiments.

In the different variant embodiments of the present invention, the circuit boards can also be of largely identical design, except for the modified radio-frequency layout on the side of the circuit board facing the radome.

Due to the uniform housing geometry and the largely uniform equipping, the different variant embodiments can be manufactured on the same production line.

Therefore, the present invention also includes a method for producing the assortment described above in which the different variant embodiments are produced on the same production line.

BRIEF DESCRIPTION OF THE DRAWINGS

In the following, exemplary embodiments of the present invention are explained in more detail on the basis of the figures.

DETAILED DESCRIPTION OF EXAMPLE EMBODIMENTS

Figure 1:
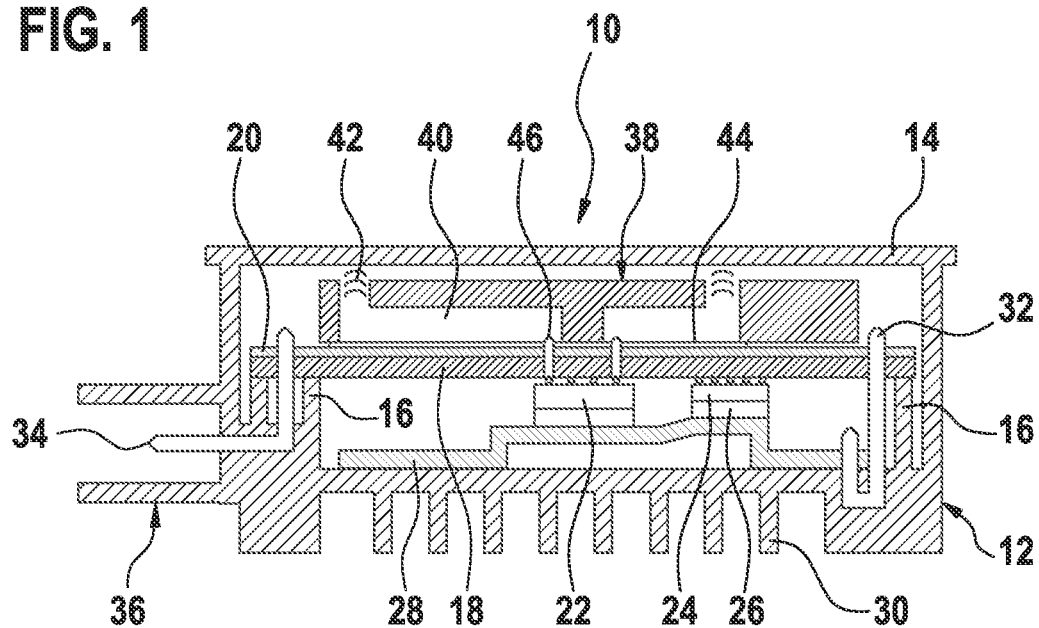
FIG. 1 shows a section through a radar sensor in a first variant embodiment of the present invention.

FIG. 1 shows a schematic sectional view of a first variant embodiment 10 of a radar sensor for motor vehicles. The radar sensor has a housing 12 that is terminated by a radome 14 on one side, the upper side in FIG. 1. In the interior, housing 12 forms a number of support domes 16 on which a circuit board 18 is fastened. On its upper side, circuit board 18 bears a microwave substrate 20, and is equipped on the lower side with at least one radio-frequency module 22 (MMIC), as well as further electronic components 24. The electronic components, which produce heat during operation, are in thermal contact, via a heat-conducting medium 26, with a heat distributor plate 28 that dissipates the heat into the base of housing 12, which forms a group of cooling ribs 30.

Circuit board 18 and microwave substrate 20 are connected both electrically and thermally, as well as mechanically, with housing 12 and with heat distributor plate 28 via press-in pins (at right in FIG. 1). Housing 12 can be metallic (with the exception of radome 14), thus forming a shielding for the electronic components.

At the left side in FIG. 1, the circuit board is contacted by press-in pins 34 that at the same time form contacts of a plug that forms an interface 36 for the exchange of data with a control device (not shown).

On microwave substrate 20, on the upper side of circuit board 18 a one-layer hollow conductor structure 38 is situated in a flat intermediate space between circuit board 18 and radome 14. This hollow conductor structure forms a plurality of hollow conductors 40 situated at the same height, which are connected, via radio-frequency connections (not shown), to signal inputs and outputs of radio-frequency module 22, and that form on the upper side radiation windows through which the microwave power 42 is radiated through the radome. Hollow conductor structure 38 can be formed for example by a metallic plastic block that is soldered onto a ground electrode 44 that covers microwave substrate 20. This ground electrode is connected to corresponding contacts of radio-frequency module 22 by vias 46, and at the same time forms the lower termination of hollow conductor 40.

Figure 2:
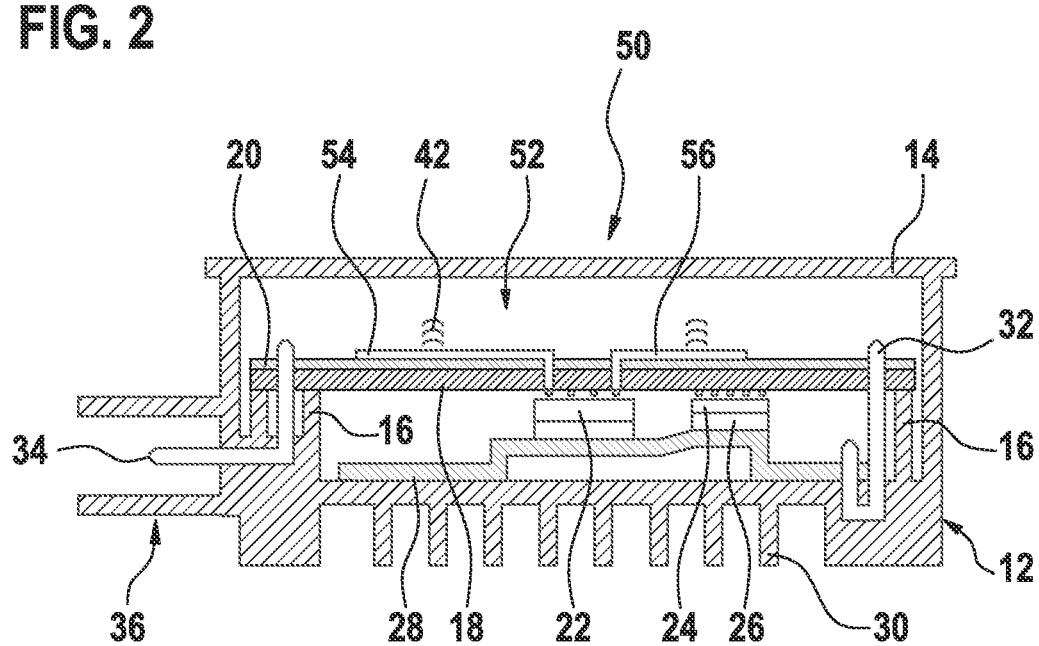
FIG. 2 shows a section through a radar sensor in a second variant embodiment of the present invention.

FIG. 2 shows a section through a radar sensor in a second variant embodiment 50. Housing 12, heat distributor plate 28, press-in pins 32, 34, and the entire interface 36 are identical in design, i.e., in shape and material, with the corresponding components in FIG. 1. Circuit board 18, radio-frequency module 22, and the other electronic components 24 can be at least largely identical with the corresponding components in FIG. 1.

Instead of the hollow conductor antenna formed by hollow conductor structure 38 in FIG. 1, in variant embodiment 50 the radar sensor has, however, a planar antenna structure 52 that is formed by microstrip conductors 54, 56 on radio-frequency substrate 20. Microstrip conductors 54, 56 are connected, in a conventional manner, to corresponding contacts of radio-frequency module 22 by vias.

The manufacturing processes for variant embodiments 10 and 50 essentially differ only in that in the one case the circuit board is equipped with hollow conductor structure 38, and in the other case the planar antenna structure 52 is formed on the circuit board in microstrip technology. Further differences may be that different materials are used for circuit board 18, or radio-frequency substrate 20. In addition, there may be some differences in the equipping with electronic components.

The components that are identical in the two variant embodiments, such as housing 12, can be produced in large piece counts, and thus efficiently, for the complete assortment. Because the required steps for the assembly of the components are also largely identical, with some differences in the equipping of circuit board 18, the two variant embodiments can be manufactured on the same production line.

Figure 3:
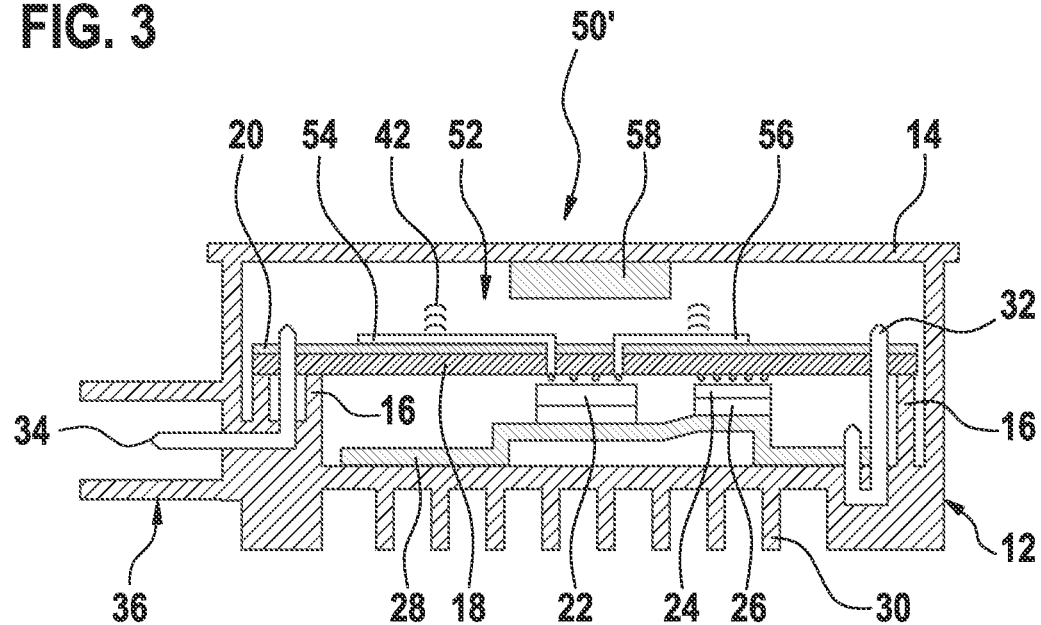
FIGS. 3 and 4 show modifications of the variant embodiment according to FIG. 2, according to the present invention.

FIG. 3 shows a modification 50' of second variant embodiment 50 according to FIG. 2. In this modification, the flat hollow space between circuit board 18 and radome 14 is used to house an absorber structure 58 that suppresses interfering radiation. Absorber structure 58 is here fastened to the underside of radome 14, for example by gluing.

Figure 4:
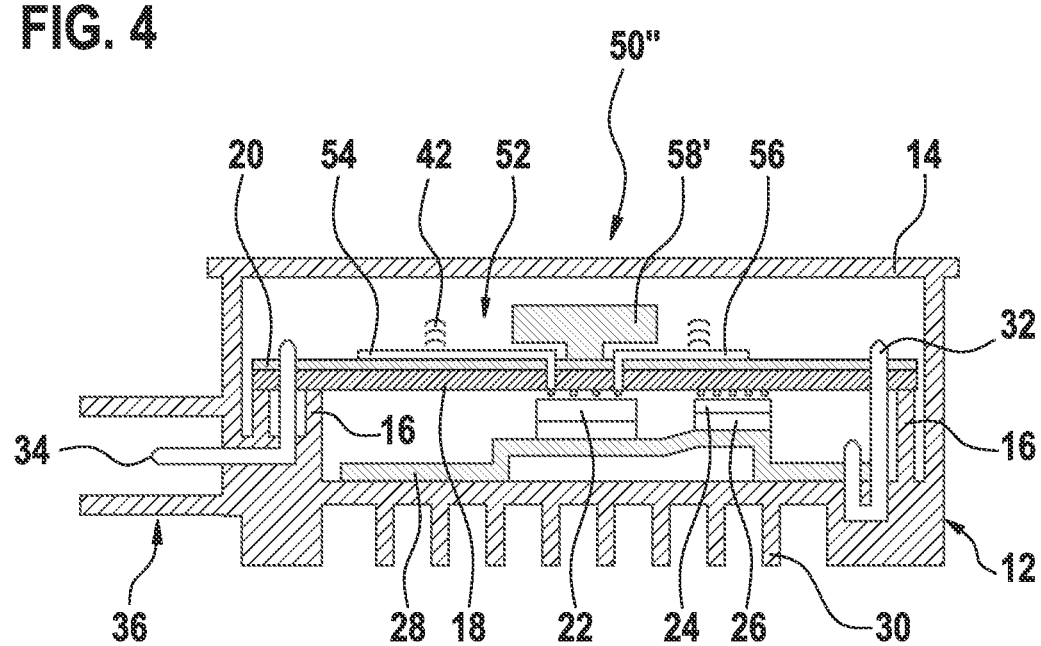

FIG. 4 shows a further variant embodiment 50", in which an absorber or shielding structure 58' is fastened on the upper side of circuit board 18, for example by soldering.

Figure 5:
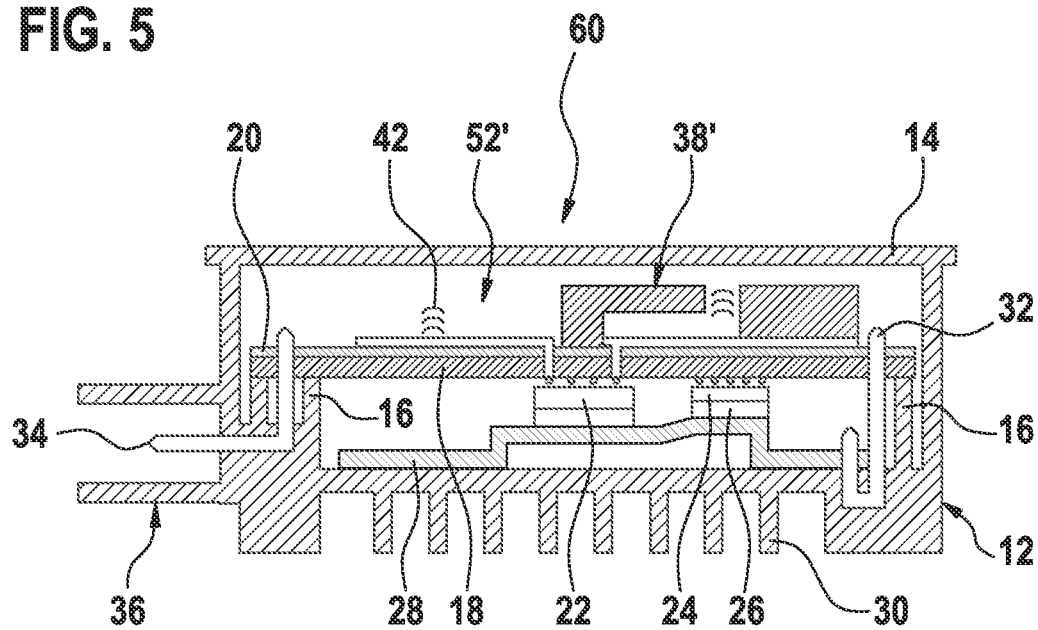
FIG. 5 shows a section through a radar sensor according to a further variant embodiment of the present invention.

FIG. 5 shows a third variant embodiment 60 having a hybrid antenna structure, formed partly by planar antenna elements 52' and partly by a hollow conductor structure 38'. For example, in a bistable radar sensor the transmit antennas can be made planar and the receive antennas can be realized as hollow conductor antennas, or vice versa.

Figure 6:
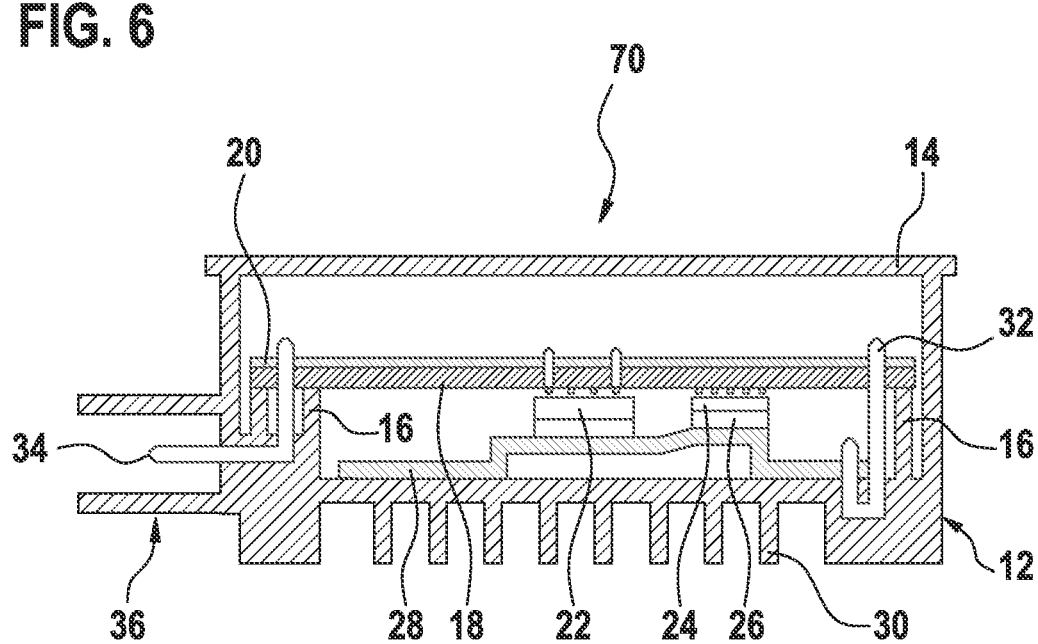
FIG. 6 shows a section through a base module that is uniform for all radar sensors of the assortment, in accordance with an example embodiment of the present invention.

FIG. 6 once again shows a base module 70, containing all those components of the radar sensors that are identical in all variant embodiments described above.

What is claimed is:

1. A method of manufacturing an assortment of radar sensors in different variant embodiments, the method comprising:
    in a single production run, producing a plurality of identical base structures, each for a respective one of the radar sensors, the plurality of identical base structures each including:
        a housing; and
        a circuit board equipped with at least one radio-frequency module;
    subsequent to the single production run:
        applying a planar antenna structure on a first side of the circuit board of each of one or more of a first subset of the plurality of identical base structures, wherein each of the one or more of the first subset has a respective radome arranged over the respective first side of the respective circuit board so that the respective planar antenna structure faces the radome, with the at least one radio-frequency module of the respective radar sensor facing away from the radome; and
        applying a hollow conductor structure on a first side of the circuit board of each of one or more of a second subset of the plurality of identical base structures, wherein each of the one or more of the second subset has a respective radome arranged over the respective first side of the respective circuit board so that the respective hollow conductor structure faces the radome, with the at least one radio-frequency module of the respective radar sensor facing away from the radome.

2. The method as recited in claim 1, wherein, in the single production run, all of the identical base structures of the radar sensors are provided with an identical interface for an exchange of data with a control device.

3. The method as recited in claim 1, wherein, in the single production run, all of the identical base structures of the radar sensors are provided with an identical heat distributor plate inside the housing.

4. The method as recited in claim 1, wherein the hollow conductor structure is a one-layer hollow conductor structure.

5. The method as recited in claim 1, further comprising:
    in at least one of the variant embodiments having the planar antenna structure, situating in the housing an absorber or shielding structure in an intermediate space between the circuit board and the radome.

* * * * *